(12) United States Patent
Park et al.

(10) Patent No.: US 9,887,420 B2
(45) Date of Patent: Feb. 6, 2018

(54) LITHIUM TRANSITION METAL COMPOSITE PARTICLES, PREPARATION METHOD THEREOF, AND CATHODE ACTIVE MATERIAL INCLUDING THE SAME

(71) Applicant: LG Chem, Ltd., Seoul (KR)

(72) Inventors: Sung Bin Park, Daejeon (KR); Ji Hye Kim, Daejeon (KR); Wang Mo Jung, Daejeon (KR); Sang Seung Oh, Daejeon (KR); Byung Chun Park, Daejeon (KR)

(73) Assignee: LG Chem, Ltd. (KR)

( * ) Notice: Subject to any disclaimer, the term of this patent is extended or adjusted under 35 U.S.C. 154(b) by 150 days.

(21) Appl. No.: 14/552,932

(22) Filed: Nov. 25, 2014

(65) Prior Publication Data

US 2015/0147655 A1 May 28, 2015

Related U.S. Application Data

(63) Continuation of application No. PCT/KR2014/007580, filed on Aug. 14, 2014.

(30) Foreign Application Priority Data

Aug. 29, 2013 (KR) .................. 10-2013-0103162

(51) Int. Cl.
*H01M 4/131* (2010.01)
*H01M 4/485* (2010.01)
(Continued)

(52) U.S. Cl.
CPC .......... *H01M 4/485* (2013.01); *H01M 4/366* (2013.01); *H01M 4/505* (2013.01); *H01M 4/525* (2013.01);
(Continued)

(58) Field of Classification Search
CPC .... H01M 4/485; H01M 4/5825; H01M 4/366; H01M 4/525; H01M 4/582;
(Continued)

(56) References Cited

U.S. PATENT DOCUMENTS

2009/0068561 A1    3/2009    Sun et al.
2009/0087362 A1    4/2009    Sun et al.
(Continued)

FOREIGN PATENT DOCUMENTS

CN      1595687 A    3/2005
CN    101414680 A    4/2009
(Continued)

OTHER PUBLICATIONS

Machine translation of JP 2010-086922, retrieved from <https://www.j-platpatinpit.go.jp/web/all/top/BTmTopEnglishPage> on Jun. 22, 2017.*
(Continued)

*Primary Examiner* — Cynthia K Walls
(74) *Attorney, Agent, or Firm* — Lerner, David, Littenberg, Krumholz & Mentlik, LLP

(57) ABSTRACT

Provided are lithium transition metal composite particle including a lithium transition metal oxide particle, a metal-doped layer formed by doping the lithium transition metal oxide particle, and LiF formed on the lithium transition metal oxide particle including the metal-doped layer, a preparation method thereof, and a lithium secondary battery including the lithium transition metal composite particles.

11 Claims, 5 Drawing Sheets

(51) Int. Cl.
*H01M 4/36* (2006.01)
*H01M 4/505* (2010.01)
*H01M 4/525* (2010.01)
*H01M 4/58* (2010.01)
*H01M 10/052* (2010.01)

(52) U.S. Cl.
CPC ......... *H01M 4/582* (2013.01); *H01M 4/5825* (2013.01); *H01M 10/052* (2013.01); *H01M 2220/30* (2013.01)

(58) Field of Classification Search
CPC ............... H01M 10/052; H01M 4/505; H01M 2220/30; Y02P 70/54; Y02E 60/122
See application file for complete search history.

(56) References Cited

U.S. PATENT DOCUMENTS

| | | |
|---|---|---|
| 2009/0104532 A1 | 4/2009 | Hosoya |
| 2011/0020708 A1 | 1/2011 | Fujiki et al. |
| 2011/0315918 A1 | 12/2011 | Kawai et al. |
| 2012/0261610 A1 | 10/2012 | Paulsen et al. |
| 2013/0040201 A1 | 2/2013 | Manthiram et al. |
| 2013/0175469 A1 | 7/2013 | Paulsen et al. |
| 2013/0323606 A1 | 12/2013 | Yoshida et al. |

FOREIGN PATENT DOCUMENTS

| | | | | |
|---|---|---|---|---|
| CN | 102569775 A | 7/2012 | | |
| CN | 102612776 A | 7/2012 | | |
| JP | 2004-006094 A | 1/2004 | | |
| JP | 2009032647 A | 2/2009 | | |
| JP | 2009104805 A | 5/2009 | | |
| JP | 2010-086922 | * 4/2010 | ............ | H01M 4/485 |
| JP | 2011028976 A | 2/2011 | | |
| JP | 2012028313 A | 2/2012 | | |
| JP | 2013510393 A | 3/2013 | | |
| JP | 2013541129 A | 11/2013 | | |
| KR | 2007-0117827 A | 12/2007 | | |
| KR | 10-0805267 B1 | 2/2008 | | |
| KR | 10-0822012 B1 | 4/2008 | | |
| KR | 10-0822013 B1 | 4/2008 | | |
| KR | 2010-0060363 A | 6/2010 | | |
| WO | 2011054441 A1 | 5/2011 | | |
| WO | 2012022624 A1 | 2/2012 | | |
| WO | 2012124240 A1 | 9/2012 | | |

OTHER PUBLICATIONS

Extended Search Report from European Application No. 14814650.9, dated Jun. 6, 2016.
Office Action from Chinese Application No. 201480001944.9, dated Apr. 25, 2016.
International Search Report from PCT/KR2014/007580, dated Nov. 24, 2014.

* cited by examiner

LITHIUM TRANSITION METAL COMPOSITE PARTICLES, PREPARATION METHOD THEREOF, AND CATHODE ACTIVE MATERIAL INCLUDING THE SAME

CROSS-REFERENCE TO RELATED APPLICATIONS

The present application is a continuation of International Application No. PCT/KR2014/007580 filed Aug. 14, 2014, which claims priority from Korean Application No. 10-2013-0103162 filed Aug. 29, 2013, the disclosures of which are hereby incorporated herein by reference.

TECHNICAL FIELD

The present invention relates to lithium transition metal composite particles including a metal-doped layer and LiF, a preparation method thereof, and a cathode active material including the lithium transition metal composite particles.

BACKGROUND ART

Lithium secondary batteries have been widely used as power sources of portable devices after they have emerged as small, lightweight, and high-capacity batteries since 1991. Recently, in line with the rapid development of electronics, communications, and computer industries, camcorders, mobile phones, and notebook PCs have appeared and undergone continuous and remarkable development. Accordingly, the demand for lithium secondary batteries as a power source for driving these portable electronic information and communication devices has increased day by day.

Lithium secondary batteries have limitations in that their lifetime rapidly decreases as charge and discharge are repeated. In particular, the above limitations are more severe at high temperature. The reason for this is due to a phenomenon that occurs when an electrolyte is decomposed or an active material is degraded due to moisture in the battery or other effects, and the internal resistance of the battery increases.

In order to address the above limitations, a technique of coating the surface of a cathode active material with an oxide of metal, such as magnesium (Mg), aluminum (Al), cobalt (Co), potassium (K), sodium (Na), and calcium (Ca), by a heat treatment has developed. Also, research to improve energy density and high-rate characteristics by adding $TiO_2$ to a $LiCoO_2$ active material has been conducted.

However, limitations, such as lifetime degradation or gas generation due to the decomposition of the electrolyte during charge and discharge, have not been fully resolved yet.

Also, a technique of coating the surface of a cathode active material with a coating agent, such as metal oxide or a metal fluoride compound, has recently been developed. This coating technique is a method in which the coating agent is adhered to the surface of the cathode active material by using a sol-gel method or colloidal method using an aqueous-based or organic-based material as a solvent and a heat treatment is then performed.

With respect to a wet process in which surface coating is performed using the solvent, electrochemical properties of structurally stable $LiCoO_2$ may be improved, but, with respect to $Li[Ni_{1-x}M_x]O_2$ or $Li[Ni_xCo_{1-2x}Mn_x]O_2$, a surface modification effect may not be obtained due to structural changes or electrochemical performance may be significantly reduced.

Furthermore, in the case that impurities are present on the surface of a cathode active material during a process of fabricating an electrode of a lithium secondary battery, aging in a step of preparing an electrode slurry during the process of fabricating an electrode of a lithium secondary battery may not only be affected, but may also cause a swelling phenomenon in the lithium secondary battery by reacting with an electrolyte solution that is injected into the lithium secondary battery.

Therefore, there is an urgent need to develop a cathode active material for a lithium secondary battery which is structurally stable and may minimize the amount of lithium impurities included in the cathode active material.

DISCLOSURE OF THE INVENTION

Technical Problem

An aspect of the present invention provides lithium transition metal composite particles which may not only minimize a swelling phenomenon that may occur due to lithium impurities on the surface of cathode active material particles, but may also be structurally stable by protecting the surface of a cathode active material from hydrogen fluoride (HF) gas generated from a surface modifier.

Another aspect of the present invention provides a method of preparing the lithium transition metal composite particles.

Another aspect of the present invention provides a cathode active material including the lithium transition metal composite particles.

Another aspect of the present invention provides a cathode and a lithium secondary battery including the cathode active material.

Technical Solution

According to an aspect of the present invention, there is provided a lithium transition metal composite particle including: a lithium transition metal oxide particle; a metal-doped layer formed by doping the lithium transition metal oxide particle; and LiF formed on the lithium transition metal oxide particle including the metal-doped layer.

According to another aspect of the present invention, there is provided a method of preparing lithium transition metal composite particles, as a first preparation method, including: mixing a mixed transition metal precursor, a lithium compound, and a metal oxide and sintering to obtain lithium transition metal oxide particles including a metal-doped layer; and mixing the lithium transition metal oxide particles including a metal-doped layer and a surface modifier, and performing a heat treatment.

According to another aspect of the present invention, there is provided a method of preparing lithium transition metal composite particles, as a second preparation method, including: mixing a mixed transition metal precursor doped with a metal and a lithium compound and sintering to obtain lithium transition metal oxide particles including a metal-doped layer; and mixing the lithium transition metal oxide particles including a metal-doped layer and a surface modifier, and performing a heat treatment.

According to another aspect of the present invention, there is provided a cathode active material including the lithium transition metal composite particles.

According to another aspect of the present invention, there is provided a cathode including the cathode active material.

According to another aspect of the present invention, there is provided a lithium secondary battery including the cathode, an anode, and a separator disposed between the cathode and the anode.

Advantageous Effects

In the case that lithium transition metal composite particles according to an embodiment of the present invention are used as a cathode active material, the lithium transition metal composite particles may reduce the amount of lithium impurities present on a surface of the cathode active material to suppress side reactions with an electrolyte solution, and thus, the lithium transition metal composite particles may minimize a swelling phenomenon.

Also, since the surface of the cathode active material may be protected from HF gas generated from a surface modifier by including a metal-doped layer that is formed by doping the lithium transition metal composite particles with a metal, structural stability of the cathode active material may be improved. Thus, electrochemical properties of a lithium secondary battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
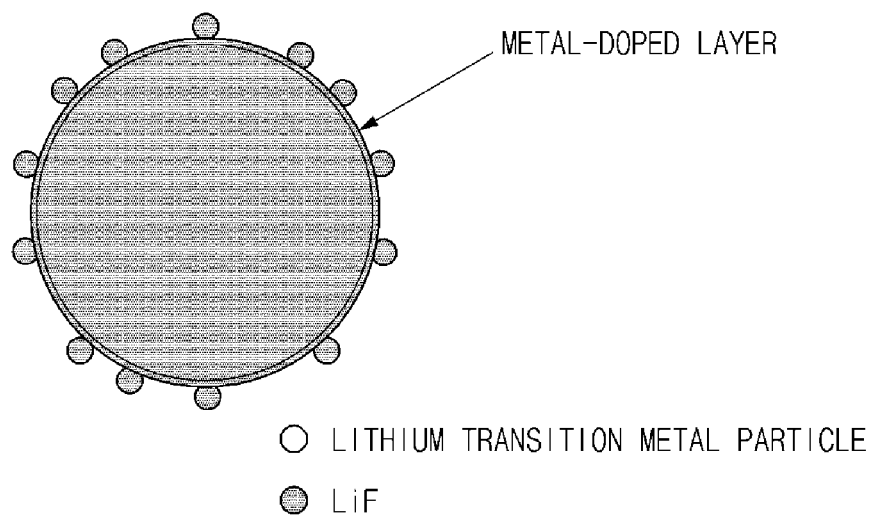
FIG. 1 is a schematic view illustrating a lithium transition metal composite particle according to an embodiment of the present invention.

According to an embodiment of the present invention, as illustrated in FIG. 1, provided is a lithium transition metal composite particle including: a lithium transition metal oxide particle; a metal-doped layer formed by doping the lithium transition metal oxide particle; and LiF formed on the lithium transition metal oxide particle including the metal-doped layer.

In general, in the case that an excessive amount of lithium impurities is present on the surface of a cathode active material, the lithium impurities may cause a phenomenon, in which a lithium secondary battery swells due to a reaction between the lithium impurities and an electrolyte solution that is injected into the lithium secondary battery, that is, a swelling phenomenon.

In the case that the lithium transition metal composite particles according to the embodiment of the present invention are used as a cathode active material, the lithium transition metal composite particles may reduce the amount of lithium impurities present on the surface of the cathode active material to suppress side reactions with the electrolyte solution, and thus, the lithium transition metal composite particles may minimize the swelling phenomenon.

That is, the lithium impurities formed on the surface of the cathode active material may be minimized by converting the lithium impurities into LiF.

The lithium impurities may include at least any one of LiOH and $Li_2CO_3$.

For example, the lithium impurities, as represented by the following Chemical Formula 2, may be included in the lithium transition metal oxide.

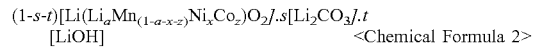

$(1-s-t)[Li(Li_aMn_{(1-a-x-z)}Ni_xCo_z)O_2].s[Li_2CO_3].t[LiOH]$ <Chemical Formula 2> where $0 \leq a < 0.3$, $0 < x < 0.9$, $0 < z < 0.6$, $0 < s < 0.05$, and $0 < t < 0.05$.

Also, since the surface of the cathode active material may be protected from hydrogen fluoride (HF) gas by including the metal-doped layer that is formed by doping the lithium transition metal oxide particles, structural stability of the cathode active material may be improved. Thus, electrochemical properties of a lithium secondary battery may be improved by reducing lithium by-products without damage to a cathode.

In contrast, in the case that the lithium transition metal oxide particles do not include the metal-doped layer, since HF gas generated from a polyvinylidene fluoride (PVdF)-based polymer may attack lithium transition metal oxide to reduce its structural stability, the lithium transition metal oxide may be structurally changed, in particular, when a heat treatment is performed.

In the lithium transition metal composite particles according to the embodiment of the present invention, the lithium transition metal oxide particles may be any one selected from the group consisting of lithium-cobalt-based oxide, lithium-manganese-based oxide, lithium-nickel-manganese-based oxide, lithium-manganese-cobalt-based oxide, and lithium-nickel-manganese-cobalt-based oxide, or a mixture of two or more thereof, and specifically, may be any one selected from the group consisting of $LiCoO_2$, $LiNiO_2$, $LiMnO_2$, $LiMn_2O_4$, $Li(Ni_aCoMn_c)O_2$ (where $0<a<1$, $0<b<1$, $0<c<1$, and $a+b+c=1$), $LiNi_{1-y}Co_yO_2$, $LiCo_{1-y}Mn_yO_2$, $LiNi_{1-y}Mn_yO_2$ (where $0 \leq Y < 1$), $Li(Ni_aCoMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$), or a mixture of two or more thereof.

Also, according to an embodiment of the present invention, a metal included in the metal-doped layer may include any one selected from the group consisting of aluminum (Al), zinc (Zn), zirconium (Zr), titanium (Ti), tungsten (W), strontium (Sr), boron (B), magnesium (Mg), yttrium (Y), molybdenum (Mo), niobium (Nb), silicon (Si), and tin (Sn), or a mixed metal of two or more thereof.

An amount of the metal that is doped in the lithium transition metal oxide particles is greater than 0 mol % and equal to or less than 2 mol %, may be in a range of 0.001 mol % to 2 mol %, and for example, may be in a range of 0.001 mol % to 1 mol % based on the lithium transition metal oxide particles.

The measurement of the doping amount of the metal is not particularly limited, and for example, inductively coupled plasma spectrometer (ICP) (Optima 5300 DV, Perkin Elmer) may be used.

Also, the metal-doped layer may be included in an amount of 0.01 wt % to 3 wt %, for example, 0.03 wt % to 1.5 wt % based on 100 wt % of the lithium transition metal composite particle.

In the case that the amount of the metal-doped layer is less than 0.01 wt %, since an amount of metal oxide is small, it may be difficult to form the metal-doped layer on the lithium transition metal oxide particles. In the case that the amount of the metal oxide is greater than 3 wt % based on a total weight of the lithium transition metal composite particles, the metal oxide may obstruct the movement of lithium ions to increase resistance. Also, since doping elements are electrochemically inert, capacity may decrease as the doping amount increases.

In the lithium transition metal composite particles according to the embodiment of the present invention, the metal-doped layer may further include lithium transition metal oxide particles, or may constitute a composite particle or composite in which the lithium transition metal oxide particle is doped with the metal.

In the present invention, the lithium transition metal oxide particle doped with the metal or the composite may be represented by Chemical Formula 1 below:

$$Li_aM_{1-b}Me_bO_2 \qquad \text{<Chemical Formula 1>}$$

in Chemical Formula 1, $M=Ni_xMn_yCo_z$, ($0.3 \leq x \leq 0.9$, $0 \leq y \leq 0.6$, and $0 \leq z \leq 0.6$), Me is any one selected from the group consisting of Al, Zn, Zr, Ti, W, Sr, B, Mg, Y, Mo, Nb, Si, and Sn, or a mixed element of two or more thereof, $0.9 \leq a \leq 1.3$, and $0 < b \leq 0.02$.

According to an embodiment of the present invention, the metal include in the metal-doped layer may have a concentration gradient in which a concentration gradually decreases from the surface of the lithium transition metal oxide particle to the inside thereof.

According to an embodiment of the present invention, the metal-doped layer may further include an oxide including the metal.

Also, according to an embodiment of the present invention, the metal-doped layer may further include LiF.

Furthermore, in the lithium transition metal composite particles according to the embodiment of the present invention, the LiF formed on the metal-doped layer may be formed by reacting a fluoride-based polymer with at least a portion of lithium impurities.

The fluoride-based polymer may be a PVdF, a polyvinylidene fluoride-hexafluoropropylene copolymer (PVdF-co-HFP), or a mixture thereof.

The LiF may be present in the form of being dispersed on the lithium transition metal oxide particle including the metal-doped layer.

Also, the LiF may be included in an amount of 0.1 wt % to 0.5 wt % based on the total weight of the lithium transition metal composite particles.

In the case that the amount of LiF is less than 0.1 wt %, an effect of minimizing the amount of lithium impurities may be insignificant, and in the case in which the amount of LiF is greater than 0.5 wt %, it is not desirable because the excessive amount of the fluoride-based polymer is required.

According to an embodiment of the present invention, a specific surface area of the lithium transition metal composite particles may be in a range of 0.2 m²/g to 2 m²/g.

In the present invention, the specific surface area may be measured by a Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

A first preparation method of the lithium transition metal composite particles according to an embodiment of the present invention may include mixing a mixed transition metal precursor, a lithium compound, and a metal oxide and sintering to obtain lithium transition metal oxide particles including a metal-doped layer; and mixing the lithium transition metal oxide particles including a metal-doped layer and a surface modifier, and performing a heat treatment.

Specifically, with respect to the lithium transition metal composite particles, lithium transition metal oxide particles including a metal-doped layer may be obtained by mixing and sintering the mixed transition metal precursor, lithium compound, and metal oxide, and the lithium transition metal oxide particles including a metal-doped layer and the surface modifier are mixed and heat treated to form LiF on the lithium transition metal oxide particles including a metal-doped layer.

According to an embodiment of the present invention, the sintering may be performed in a temperature range of 800° C. to 1,000° C., for example, 850° C. to 950° C. for 5 hours to 10 hours.

Also, the heat treatment may be performed in a temperature range of 300° C. to 500° C. for 5 hours to 10 hours.

Any mixed transition metal precursor typically used for the preparation of a cathode active material in the art may be used as the mixed transition metal precursor, but the present invention is not limited thereto. For example, a precursor compound having a composition of MOOH or M(OH)₂ (where $M=Ni_xMn_yCo_z$, $0.3 \leq x \leq 0.9$, $0 \leq y \leq 0.6$, $0 \leq z \leq 0.6$, and $x+y+z=1$) may be used as the mixed transition metal precursor.

The lithium compound (lithium source), for example, may be $Li_2CO_3$, LiOH, or a mixture thereof, but the present invention is not limited thereto.

A fluoride-based polymer may be used as the surface modifier, and examples of the fluoride-based polymer may be PVdF, a PVdF-co-HFP, or a mixture thereof.

The surface modifier may be used in an amount of 0.2 wt % to 0.5 wt % based on a total weight of the lithium transition metal oxide particles.

Also, according to an embodiment of the present invention, the metal oxide may include any one selected from the group consisting of $Al_2O_3$, ZnO, $ZrO_2$, $TiO_2$, $WO_3$, $SrO_2$, $B_2O_3$, MgO, $Y_2O_3$, $MoO_3$, $Nb_2O_3$, $Nb_2O_6$, $SiO_2$, and SnO, or a mixture of two or more thereof.

The metal oxide may be used in an amount of 0.1 wt % to 1 wt % based on the total weight of the lithium transition metal composite particles.

According to an embodiment of the present invention, in the case that PVdF or a PVdF-co-HFP is used as the surface modifier, the lithium compound may be reacted with HF gas generated from the PVdF or PVdF-co-HFP to be converted into LiF. Since the LiF is a material that does not cause side reactions with the electrolyte solution, the amount of lithium impurities may be significantly decreased by the conversion into the LiF.

However, the HF gas generated from the PVdF or PVdF-co-HFP as the surface modifier may not only react with lithium impurities as described above, but may also attack the surface of the cathode active material. Thus, the structural stability of the cathode active material may be reduced.

Therefore, in the present invention, since the metal-doped layer capable of protecting the surface of the cathode active material even if the HF gas is generated may be formed and included, the reaction of the surface of the lithium transition metal oxide particles with the HF gas may be prevented by the metal-doped layer.

Also, a second preparation method of the lithium transition metal composite particles according to an embodiment of the present invention may include mixing a mixed transition metal precursor doped with a metal and a lithium compound and sintering to obtain lithium transition metal oxide particles including a metal-doped layer; and mixing the lithium transition metal oxide particles including a metal-doped layer and a surface modifier, and performing a heat treatment.

In the second preparation method, the compounds used in the first preparation method may be used as the surface modifier and the lithium compound, and the sintering and the heat treatment may also be performed under similar conditions to those of the first preparation method. However, the mixed transition metal precursor doped with a metallic element may be used by using the metal oxide during the preparation of the mixed transition metal precursor.

In the lithium transition metal composite particles prepared according to the first and second preparation methods, since the metal-doped layer is formed on the lithium transition metal oxide particles to protect the surface of the lithium transition metal oxide particles, the lithium transition metal composite particles may improve the structural stability of the cathode active material when used in the cathode active material. In addition, since LiF, which does not cause side reactions with the electrolyte solution, is formed on the metal-doped layer, the amount of lithium impurities is significantly reduced. Thus, the decrease in capacity and swelling phenomenon of the lithium secondary battery may be minimized.

The amount of the lithium impurities included in the lithium transition metal composite particles according to the present invention may be less than 0.3 wt % based on the total weight of the lithium transition metal composite particles. Since the lithium impurities, such as LiOH or $Li_2CO_3$, may have a high reactivity with respect to the electrolyte solution, an excessive swelling phenomenon may occur in the case in which the amount of the lithium impurities present on the surface of the lithium transition metal composite particles is 0.3 wt % or more.

The present invention provides a cathode active material including the lithium transition metal composite particles.

Also, the present invention provides a cathode including the cathode active material.

The cathode may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

Any metal may be used as the metal current collector so long as it is a metal having high conductivity as well as no reactivity in a voltage range of the battery to which the slurry of the cathode active material may be easily adhered. Non-limiting examples of the cathode collector may include aluminum, nickel, or a foil prepared by a combination thereof.

An organic solvent, such as N-methylpyrrolidone (NMP), dimethylformamide (DMF), acetone, and dimethylacetamide, or water may be used as the solvent for forming the cathode. These solvents may be used alone or in a mixture of two or more thereof. An amount of the solvent used may be sufficient if the solvent may dissolve and disperse the cathode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly(acrylic acid), polymers in which hydrogens thereof are substituted with lithium (Li), sodium (Na), or calcium (Ca), or various copolymers, may be used as the binder.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Also, the present invention provides a lithium secondary battery including the cathode, an anode, and a separator disposed between the cathode and the anode.

A carbon material, lithium metal, silicon, or tin, which may intercalate and deintercalate lithium ions, may be typically used as an anode active material that is used in the anode according to an embodiment of the present invention. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Furthermore, the anode collector is generally fabricated to have a thickness of 3 µm to 500 µm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength of an anode active material. The anode collector may have various shapes such as a film, a sheet, a foil, a net, a porous body, a foam body, a non-woven fabric body, and the like.

Similar to the cathode, a binder and a conductive agent, which are typically used in the art, may be used in the anode. An anode active material and the above additives are mixed and stirred to prepare an anode active material composition. Then, a current collector is coated therewith and pressed to prepare the anode.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery. However, the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Hereinafter, the present invention will be described in more detail, according to examples and experimental examples. However, the present invention is not limited thereto.

Example 1

Preparation of Lithium Transition Metal Composite Particles

MOOH (M=$Ni_{0.6}Mn_{0.2}Co_{0.2}$) was used as a mixed transition metal precursor, the mixed transition metal precursor and $Li_2CO_3$ were mixed at a stoichiometric ratio (Li:M=1.02:1), and 0.2 mol % of $ZrO_2$ as a metal oxide was added to the mixture. The mixture was sintered at about 910° C. for 10 hours in air to prepare $LiM_{0.998}Zr_{0.002}O_2$ composite particles doped with Zr. Thereafter, 0.5 wt % of polyvinylidene fluoride (PVdF) as a surface modifier was added to the $LiM_{0.998}Zr_{0.002}O_2$ composite particles doped with Zr, and a heat treatment was performed at 350° C. for 5 hours in air. In this case, in the lithium transition metal composite particles, the amount of LiF was 0.2 wt % and the amount of Zr was 0.2 mol %.

Comparative Example 1

$LiNi_{0.6}Mn_{0.2}Co_{0.2}O_2$ composite particles not doped with Zr were prepared in the same manner as in Example 1 except that $ZrO_2$ as a metal oxide was not added.

<Preparation of Lithium Secondary Battery>

Example 2

Cathode Preparation

The $LiM_{0.998}Zr_{0.002}O_2$ composite particles doped with 0.2 mol % of Zr and including LiF prepared in Example 1 were used as a cathode active material.

A cathode mixture slurry was prepared by adding 94 wt % of the cathode active material, 3 wt % of carbon black as a conductive agent, and 3 wt % of PVdF as a binder to N-methyl-2-pyrrolidone (NMP) as a solvent. An about 20 μm thick aluminum (Al) thin film as a cathode collector was coated with the cathode mixture slurry and dried, and the Al thin film was then roll-pressed to prepare a cathode.

Anode Preparation

An anode active material slurry was prepared by mixing 96.3 wt % of carbon powder as an anode active material, 1.0 wt % of super-p as a conductive agent, and 1.5 wt % of styrene-butadiene rubber (SBR) and 1.2 wt % of carboxymethyl cellulose (CMC) as a binder, and adding the mixture to NMP as a solvent. A 10 μm thick copper (Cu) thin film as an anode collector was coated with the anode active material slurry and dried, and the Cu thin film was then roll-pressed to prepare an anode.

Non-Aqueous Electrolyte Solution Preparation

A 1 M $LiPF_6$ non-aqueous electrolyte solution was prepared by adding $LiPF_6$ to a non-aqueous electrolyte solvent that was prepared by mixing ethylene carbonate and diethyl carbonate, as an electrolyte, at a volume ratio of 30:70.

Lithium Secondary Battery Preparation

A mixed separator of polyethylene and polypropylene was disposed between the cathode and anode thus prepared, and a polymer type battery was then prepared by a typical method. Then, the preparation of each lithium secondary battery was completed by injecting the prepared non-aqueous electrolyte solution.

Comparative Example 2

A lithium secondary battery was prepared in the same manner as in Example 2 except that the $LiNi_{0.6}Mn_{0.2}Co_{0.2}O_2$ composite particles prepared in Comparative Example 1 were used as a cathode active material.

Experimental Example 1

X-ray diffraction analysis was performed to investigate structural changes of the lithium transition metal composite particles prepared in Example 1 and Comparative Example 1 before and after the heat treatment. The results thereof are presented in FIGS. 2A and 2B, respectively.

Figure 2A:
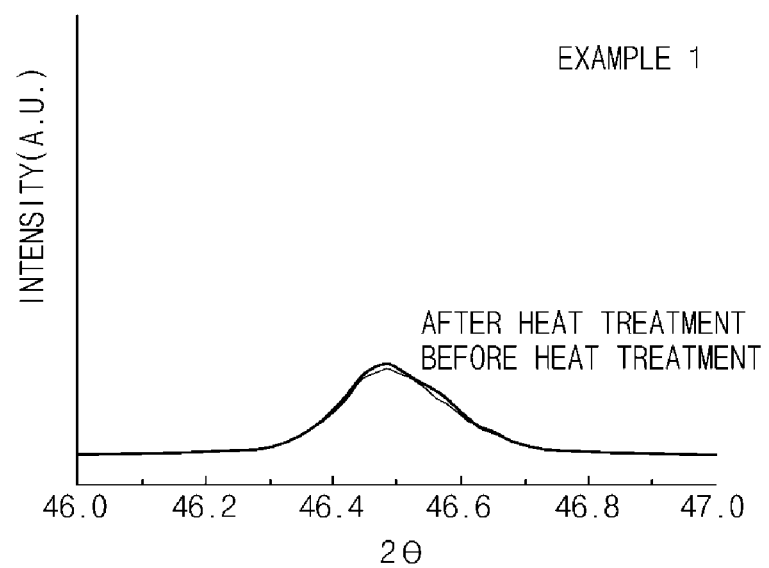
FIGS. 2A and 2B are respectively graphs illustrating the results of X-ray diffraction analysis for identifying changes in peak due to LiF doping of Example 1 and Comparative Example 1 before and after a heat treatment according to Experimental Example 1 of the present invention.

Specifically, the $LiM_{0.998}Zr_{0.002}O_2$ composite particles doped with 0.2 mol % of Zr and including LiF of Example 1 were heat treated at 350° C. for 5 hours, and FIG. 2A illustrates the results of the X-ray diffraction analysis before and after the heat treatment.

As illustrated in FIG. 2A, there was no peak shift before and after the heat treatment. This indicates that the structure of the lithium transition metal composite particles doped with Zr and including LiF was very stable even if the lithium transition metal composite particles were heat treated at 350° C. for 5 hours.

Figure 2B:
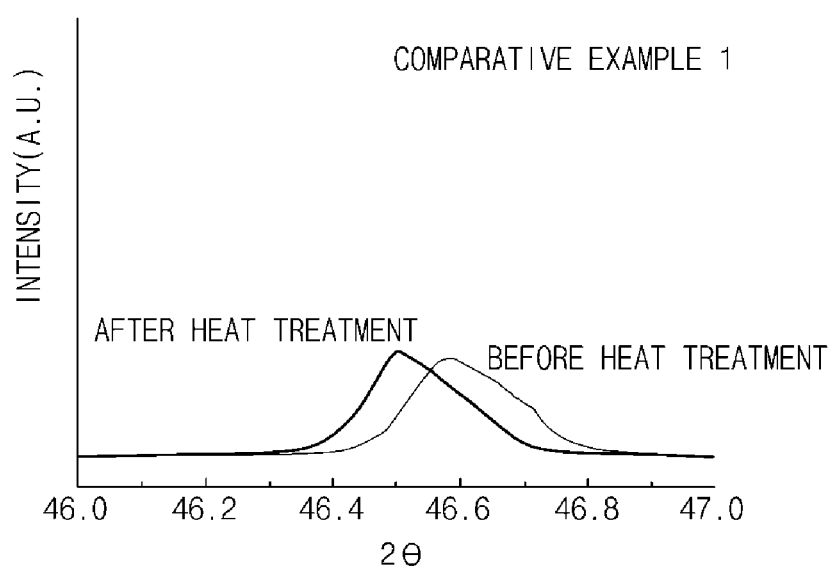

In contrast, in FIG. 2B, it may be confirmed that a peak shift occurred before and after the heat treatment. The fact that the peak shift occurred after the heat treatment means that the $LiNi_{0.6}Mn_{0.2}Co_{0.2}O_2$ composite particles not doped with Zr were structurally changed.

That is, with respect to Comparative Example 1, since the $LiNi_{0.6}Mn_{0.2}Co_{0.2}O_2$ composite particles were not doped with Zr, HF gas, which was generated from the PVdF-based polymer, attacked $LiNi_{0.6}Mn_{0.2}Co_{0.2}O_2$ to reduce structural stability. Thus, the $LiNi_{0.6}Mn_{0.2}Co_{0.2}O_2$ composite particles were structurally changed.

Therefore, in FIGS. 2A and 2B, it may be understood that the doping of the $LiNi_{0.6}Mn_{0.2}Co_{0.2}O_2$ composite particles with Zr may improve the structural stability of the cathode active material by protecting the surface of the lithium transition metal oxide particles.

Experimental Example 2

Figure 3A:
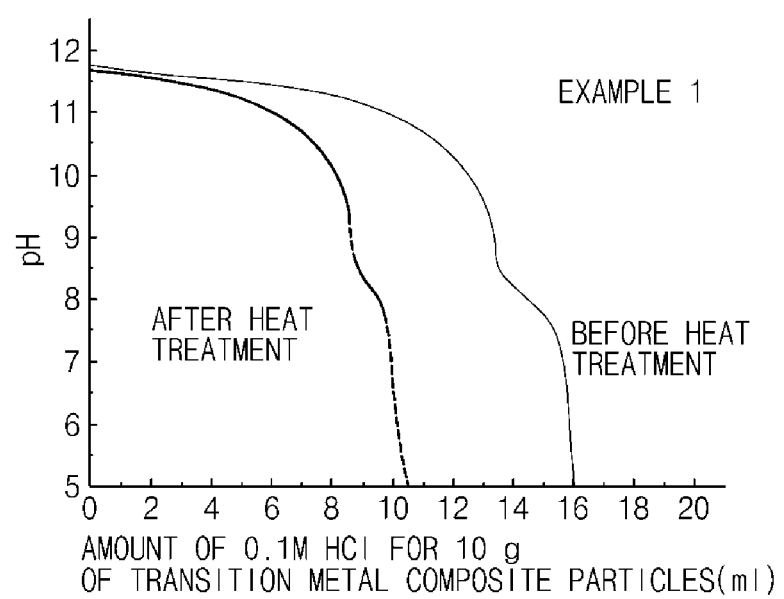
FIGS. 3A and 3B are respectively graphs illustrating the results of pH titration for investigating the amounts of lithium impurities of Example 1 and Comparative Example 1 before and after a heat treatment according to Experimental Example 2 of the present invention.
Figure 3B:
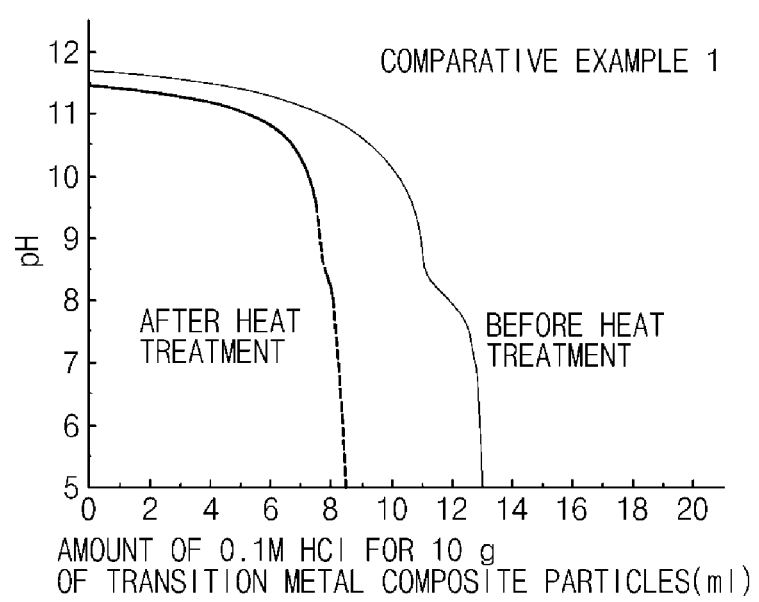

A pH titration was performed to investigate the amount of lithium impurities in the $LiNi_{0.6}Mn_{0.2}Co_{0.2}O_2$ composite particles prepared in Example 1 and Comparative Example 1, and the results thereof are presented in FIGS. 3A and 3B. Metrohm 794 was used as a pH meter, and pH values were recorded by adding an amount of 0.02 ml for each titration.

FIGS. 3A and 3B respectively compare the amounts of 0.1 M HCl for 10 g of the $LiNi_{0.6}Mn_{0.2}Co_{0.2}O_2$ composite particles of Example 1 and Comparative Example 1 before and after the heat treatment according to the pH value.

When comparing the amounts of hydrochloric acid used in a hydrochloric acid titration with reference to FIGS. 3A and 3B, the amounts of lithium impurities of Comparative Example 1 and Example 1 after the heat treatment were 35% and 34%, respectively.

<Electrochemical Evaluation Experiments>

The following electrochemical evaluation experiments were conducted to investigate initial charge and discharge capacities, high rate characteristics, and life characteristics of the lithium secondary batteries obtained in Example 2 and Comparative Example 2.

The lithium secondary batteries obtained in Example and Comparative Example 2 were charged at a constant current (CC) of 0.1 C to a voltage of 4.25 V at 25° C., and thereafter, charge in the first cycle was performed by charging the lithium secondary batteries at a constant voltage (CV) of 4.25 V to a current of 0.05 mAh. After the batteries were left standing for 20 minutes, discharge capacities in the first cycle were measured by discharging the batteries at a constant current of 0.1 C to a voltage of 3.0 V. Also, with respect to each battery of Example 2 and Comparative Example 2, initial charge and discharge capacities, high rate characteristics, and life characteristics were measured under different charge and discharge conditions as illustrated in Table 1 below. The results thereof are presented in Table 1 below.

TABLE 1

| | 1$^{st}$ CHQ | 1$^{st}$ disQ | EFF(%) | 1.0/0.1 | 2.0/0.1 | 30 cycles |
|---|---|---|---|---|---|---|
| Example 2 | 190.33 | 179.7 | 94.4% | 93.4% | 90.5% | 97.5% |
| Comparative Example 2 | 193.4 | 174.1 | 90.0% | 92.3% | 88.8% | 97.4% |

As illustrated in Table 1, with respect to the lithium secondary battery of Example 2 in which the cathode active material including the lithium transition metal composite particles of the present invention was used, the initial charge and discharge capacities, efficiency, and rate characteristics were respectively increased by 3% or more, about 4%, and about 1% or more in comparison to those of the lithium secondary battery of Comparative Example 2 in which the cathode active material including the $LiNi_{0.6}Mn_{0.2}Co_{0.2}O_2$ composite particles not doped with Zr. Thus, it may be confirmed that an overall performance of the lithium secondary battery was increased.

INDUSTRIAL APPLICABILITY

In the case that lithium transition metal composite particles according to an embodiment of the present invention are used as a cathode active material, since the lithium transition metal composite particles may reduce the amount of lithium impurities present on the surface of the cathode active material to suppress side reactions with an electrolyte solution, the lithium transition metal composite particles may minimize a swelling phenomenon and may improve electrochemical properties of a lithium secondary battery. Thus, the lithium transition metal composite particles may be suitable for a secondary battery.

The invention claimed is:

1. A lithium transition metal composite particle comprising:
    a lithium transition metal oxide particle;
    a zirconium-doped layer formed by doping the lithium transition metal oxide particle;
    LiF formed on the lithium transition metal oxide particle including the zirconium-doped layer,
    wherein the zirconium-doped layer comprises composite particles of Chemical Formula 1:

$Li_aM_{1-b}Zr_bO_2$ 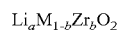 <Chemical Formula 1> where M=$Ni_xMn_yCo_z$, (0.3≤x≤0.9, 0≤y≤0.6, and 0≤z≤0.6),
    0.9≤a≤1.3, and
    0≤b≤0.02.

2. The lithium transition metal composite particle of claim 1, wherein the zirconium-doped layer is included in an amount of 0.01 wt % to 3 wt % based on 100 wt % of the lithium transition metal composite particle.

3. The lithium transition metal composite particle of claim 1, wherein the zirconium has a concentration gradient in which a concentration gradually decreases from a surface of the lithium transition metal oxide particle to inside thereof.

4. The lithium transition metal composite particle of claim 1, wherein the zirconium-doped layer further comprises an oxide including the zirconium.

5. The lithium transition metal composite particle of claim 1, wherein a doping amount of the zirconium is greater than 0 mol % and equal to or less than 2 mol %.

6. The lithium transition metal composite particle of claim 1, wherein the LiF is included in an amount of 0.1 wt % to 0.5 wt % based on a total weight of the lithium transition metal composite particles.

7. The lithium transition metal composite particle of claim 1, wherein the lithium transition metal oxide is any one selected from the group consisting of lithium-cobalt-based oxide, lithium-manganese-based oxide, lithium-nickel-manganese-based oxide, lithium-manganese-cobalt-based oxide, and lithium-nickel-manganese-cobalt-based oxide, or a mixture of two or more thereof.

8. The lithium transition metal composite particle of claim 7, wherein the lithium transition metal oxide is any one selected from the group consisting of $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0\leq Y<1$), $Li(Ni_aCo_bMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$), or a mixture of two or more thereof.

9. A cathode active material comprising the lithium transition metal composite particles of claim 1.

10. A cathode comprising the cathode active material of claim 9.

11. A lithium secondary battery comprising:
a cathode;
an anode; and
a separator disposed between the cathode and the anode,
wherein the cathode is the cathode of claim 10.

* * * * *